Jan. 15, 1963

W. STELZER 3,073,339

CHECK VALVES

Filed May 1, 1959

INVENTOR
WILLIAM STELZER

BY John V. Phillips

ATTORNEY

# United States Patent Office 3,073,339
Patented Jan. 15, 1963

3,073,339
CHECK VALVES
William Stelzer, Bloomfield Hills, Mich., assignor to Kelsey-Hayes Company, Detroit, Mich., a corporation of Delaware
Filed May 1, 1959, Ser. No. 810,340
9 Claims. (Cl. 137—516.15)

This invention relates to check valves.

An important object of the invention is to provide a novel form of check valve structure wherein the valve element itself is formed of resilient material such as rubber and which is so formed as to be highly efficient in operation.

More specifically, an object of the invention is to provide a check valve structure wherein the check valve itself is provided with an axial opening surrounded by a lip adapted to engage a seat to seal against the flow of fluid in one direction, and to form the valve element with an integral reinforcing rib at the side of the valve element opposite the lip referred to, thus stiffening the radially inner portion of the valve element to render the seating thereof more efficient.

A further object is to provide such a structure wherein the reinforcing rib and valve lip combine with the radially inner portion of the valve to provide substantial stiffness of such portion of the valve element, to provide at the radially outer edge of the valve element a bead to facilitate the attachment of the valve element to the structure with which it is associated, and to provide the valve element with a radially intermediate portion which is relatively thin and highly resilient for the free movement of the valve lip to and from its seat.

A further object is to provide such a structure wherein the reinforcing rib serves to assist in retaining in position an axial spring which may be used to bias the valve to closed position.

A further object is to provide a check valve structure having an integral valve housing of novel form adapted to cooperate with the resilient valve element and with a casing or other structure with which the check valve is to be used to effectively fix the valve structure in position relatively to the container or receptacle and to use one wall of the latter as a seat for the valve element.

A further object is to provide such a structure wherein the valve housing and the wall of the receptacle or the like combine to engage the annular bead at the radially outer edge of the valve element to fix the valve elment in position and to seal the structure against leakage between the valve housing and the receptacle.

A further object is to provide a structure of the character just referred to wherein a single screw or similar fastening element is all that is required to properly secure the parts of the device with respect to each other and with respect to the receptacle, casing, or the like in connection with which the check valve structure is employed.

Other objects and advantages of the invention will become apparent during the course of the following description.

In the drawings I have shown one embodiment of the invention. In this showing:

Figure 1:
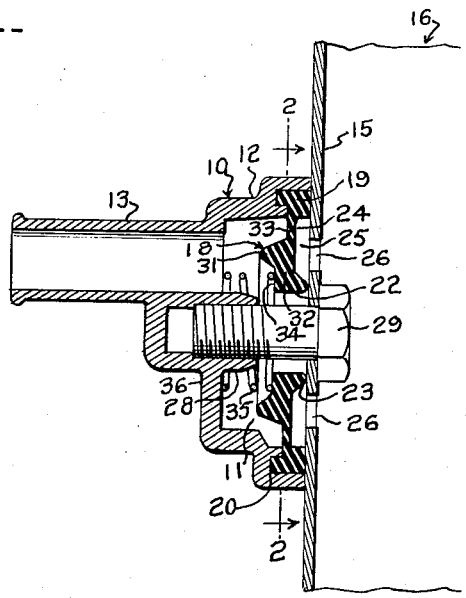
FIGURE 1 is an axial sectional view through the valve device, a portion of the casing with which the device is used being shown.
Figure 2:
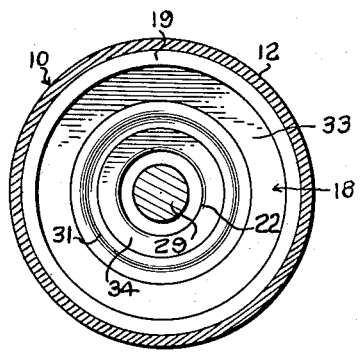
FIGURE 2 is a section taken substantially on line 2—2 of FIGURE 1.
Figure 3:
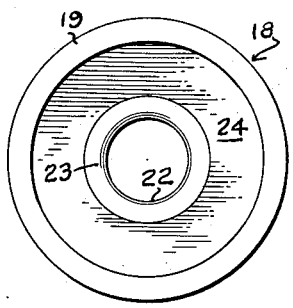
FIGURE 3 is a view of the inner face of the valve element.

Referring to the drawing, the numeral 10 designates a valve housing as a whole having therein a chamber 11 formed within an annular flange portion 12 formed on the valve housing. The chamber 11 communicates with the interior of a nipple 13 formed integral with the valve housing 10.

The free edge of the flange portion 12 engages against a wall 15 of a container, receptacle or the like, indicated as a whole by the numeral 16. A resilient valve element 18 is arranged within the flange portion 12 and is provided with a peripheral bead portion 19 received in a suitably shaped annular channel 20 in the flange portion 12 and seated against the wall 15. The bead 19 thus serves two purposes, namely, to support the valve element 18 in proper position and to provide a seal between the valve housing 10 and wall 15 to prevent leakage therebetween.

The valve element 18 is provided with a large axial opening 22 at the inner end of which the valve element 18 is provided with a lip 23 normally engaging the wall 15. This lip may have its extremity rather sharply curved in cross section to provide for substantially a circular line engagement of the lip 23 with the wall 15 which provides an efficient sealing engagement between the lip 23 and wall 15, as will become more apparent below. The lip 23 projects laterally from the adjacent face 24 of the valve element 18 to provide a space 25 which communicates with the interior of the receptacle 16 through suitable openings 26.

The valve body 10 is provided with a central internally threaded boss 28 receiving the threaded end of a stud 29 passing through the wall 15. This stud draws the free edge of the flange portion 12 tightly against the wall 15 to tightly seat the bead 19 and provide the leak-proof joint referred to.

The face of the valve element 18 opposite the lip 23 is provided with an integral reinforcing rib 31. This rib is annular and of larger diameter than the lip 23. The portion of the valve element 18 between the lip 23 and rib 31, namely the portion 32, is relatively thick. Therefore the radially inner portion of the valve element 18 comprising the lip 23, rib 31 and portion 32 provides substantial thickness which renders the radially inner portion of the valve element 18 comparatively stiff even though the material from which the valve element is made is highly resilient.

Between the rib 31 and bead 19, the valve element is provided with an annular relatively thin portion 33. Such thin portion of the valve elements renders the thicker radially inward portion of such element freely movable laterally of the wall 15 to seat and unseat the valve lip 23.

Radially inwardly of the rib 31, the valve element is provided with a flat face 34 engaged by one end of a spring 35 which biases the valve to closed position. The other end of the spring 35 engages the back wall 36 of the valve housing 10. This spring is prevented under any conditions from being substantially laterally displaced since it surrounds the boss 28 and is arranged within the rib 31. This rib therefore serves not only to assist in stiffening the radially inner portion of the valve element but also in positioning the spring.

OPERATION

As previously stated, the present check valve structure is particularly intended for use against a wall of a receptacle or the like. Specifically, the use of the valve structure is particularly effective in conjunction with the vaccum suspended motors of vehicle booster brake mechanisms in which case the wall 15 will be a portion of the wall of the constant vacuum chamber of the motor, while the nipple 13 will be connected to a source of vacuum such as the intake manifold of a vehicle engine. It will become apparent, therefore, that the present device will function during operation of a motor vehicle engine to effectively maintain vacuum in the chamber within the wall 15.

The axial opening 22 through the valve element 18 is substantially larger than the shank of the attaching stud 29, to provide a passage for evacuation of air from the receptacle 16. The valve lip 23 is normally seated as shown and remains seated so long as pressure in the container 16 is no higher than pressure in the chamber 11.

Assuming that pressure in the receptacle 16 becomes higher than pressure in the chamber 11, such pressure will act against the valve face 24 and the lip 23 radially outwardly of its contact edge, thus unseating the valve lip 23 for the exhaustion of air through openings 26, opening 22 and chamber 11 and into the source of vacuum. The spring 35 can be relatively light, and this fact together with the high degree of flexibility of the thin annular valve portion 33 permits the valve readily to unseat for the exhaustion of air from the receptacle 16. As soon as pressures are substantially balanced on opposite sides of the valve 18, the spring 35 will seat the lip 23.

It will be apparent that the substantial mass of rubber or other resilient material forming the radially inner portion of the valve 18 substantially stiffens such portion of the valve, thus tending strongly to maintain the narrow contact edge of the lip 23 in a plane accurately engaging the wall 15 or ready to accurately engage such wall. At the same time, the relatively thin lip 23 preserves adjacent the contact thereof a high degree of flexibility to permit the contact edge of the lip to perfectly accommodate itself to the surface of the wall 15. Such wall therefore may be a stamping which, without being machined, forms an efficient seat for engagement with the valve lip 23 to perfectly seal the chamber 11 from the interior of the receptacle 16 when the valve is closed.

As previously stated, the bead 19 not only serves to effectively hold the valve element 18 in proper position but also forms a seal between the valve housing 10 and wall 15. The single stud 29 serves to maintain such seal and to accurately maintain the parts in proper positions with respect to each other.

The valve device is highly simplified and very economical to manufacture and is easily assembled with respect to the receptacle 16. The holes 26, together with the hole through which the shank of the stud projects, may be punched or drilled. The spring 35 is inserted in the housing 10, the bead 19 placed in position in the recess 20, and the stud 29 applied to mount the valve structure relative to the wall 15. The single integral valve element 18 may be easily molded of rubber or other resilient material at a very low cost.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A chack valve structure comprising a housing having an annular flange provided with a chamber therein and an outlet nipple communicating with such chamber, said flange having an annular free edge portion engageable against an apertured wall of a receptacle and provided with an annular channel, a resilient valve element provided with a peripheral bead shaped to fit in said channel and having a surface substantially flush with said free edge portion of said flange and engageable against the wall of the receptacle to form a seal between said flange and said wall, said valve element having an axial opening therethrough and being formed at one side surrounding such opening with an integral annular thin-edged lip engageable against the wall of the receptacle, the apertures in such wall being radially outwardly of said lip, an annular reinforcing rib formed integral with said valve element at the side thereof opposite said lip and of larger diameter than such lip, said rib and said lip combining to form a relatively thick annular radially inward portion of said valve element to lend substantial stiffness thereto, said valve element between said rib and said bead having a relatively thin highly flexible portion to provide for free movement of said lip toward and away from said wall, said bead being thicker than said flexible portion of said valve element to be retained in position by said channel.

2. A structure according to claim 1 wherein said valve housing is provided with a threaded opening coaxial with the opening in said valve element, and a single threaded stud smaller than said opening passing through the wall of the receptacle and through the opening in said valve element and into said threaded opening to fix said valve housing to the wall of the receptacle and to maintain said bead in sealing engagement therewith.

3. A structure according to claim 1 wherein said valve housing is provided with a threaded opening coaxial with the opening in said valve element, a single threaded stud smaller than said opening passing through the wall of the receptacle and through the opening in said valve element and into said threaded opening to fix said valve housing to the wall of the receptacle and to maintain said bead in sealing engagement therewith, the side of said valve element opposite said lip being provided with a flat face radially inwardly of said rib, and a coil spring concentric with said stud and engaging at opposite ends against said flat face and against said valve housing, said spring being of smaller diameter than said rib.

4. In combination with a wall of a receptacle, a valve body having an annular flange provided with a free end engaging said wall and having a chamber formed therein, said valve body having an outlet nipple communicating with said chamber, an integral check valve element formed of resilient material and provided with an axial opening of substantial size, said element having an annular integral valve lip projecting from one side thereof surrounding said axial opening and normally engaging said wall, the free edge portion of said flange having an annular channel, said valve element having an attaching and sealing bead fitting and arranged in said channel and having one face substantially flush with said free end of said flange in sealing engagement with said wall, said wall being provided between said lip and said bead with apertures, and a single attaching stud passing through said wall and threaded into said housing for securing the latter to said wall and for sealing said bead relative to the latter, said stud having a shank projecting through said axial opening coaxially thereof and of smaller diameter than such opening.

5. The combination set forth in claim 4 wherein said valve element is provided with an integral annular reinforcing bead projecting from the side thereof opposite said valve lip, said rib and said lip cooperating to relatively stiffen the radially inner portion of said valve element, said valve element being provided between said rib and said bead with a thin annular highly flexible portion for the free movement of said lip toward and away from said wall.

6. The combination set forth in claim 4 wherein said valve element is provided with an integral annular reinforcing bead projecting from the side thereof opposite said valve lip, said rib and said lip cooperating to relativley stiffen the radially inner portion of said valve element, said valve element being provided between said rib and said bead with a thin annular highly flexible portion for the free movement of said lip toward and away from said wall, said valve element being provided at the side opposite said lip with a flat surface radially inwardly of said rib, and a coil spring of slightly smaller diameter than said rib coaxial with and surrounding said stud and engaging at opposite ends against said flat face and against said housing.

7. A check valve structure comprising a valve body having an annular flange forming a chamber therein, said flange having a free end engageable against an apertured wall of a receptacle, a resilient check valve element having a peripheral portion arranged radially within and engaging said flange and having a surface substantially flush with said free end of said flange and engageable with said wall of said receptacle to seal said flange relative thereto, said valve element having an axial opening and an annular thin-edged valve lip surrounding such opening and projecting from one side of said valve element normally into engagement with the wall of the receptacle radially inwardly of the aperture therein, said valve element being provided at the side opposite said lip with an annular integral stiffening rib of larger diameter than said lip, said rib and said lip combining to substantially stiffen the radially inner portion of said valve element, said valve element being provided between said rib and the flange of said housing with a relatively thin highly flexible annular portion for the free movement of said lip toward and away from the wall of the receptacle, said valve element being provided at the side thereof opposite said lip with a flat face radially inwardly of said rib, and a biasing spring slightly smaller in diameter than said rib and arranged between and engaging said face and said housing.

8. A check valve structure comprising a valve body having an annular flange forming a chamber therein, said flange having a free end engageable against an apertured wall of a receptacle, a resilient check valve element having a perpiheral portion arranged radially within and engaging said flange and having a surface substantially flush with said free end of said flange and engageable with said wall of said receptacle to seal said flange relative thereto, said valve element having an axial opening and an annular thin-edged valve lip surrounding such opening and projecting from one side of said valve element normally into engagement with the wall of the receptacle radially inwardly of the aperture therein, said valve element being provided at the side opposite said lip with an annular integral stiffening rib of larger diameter than said lip, said rib and said lip combining to substantially stiffen the radially inner portion of said valve element, said valve element being provided between said rib and the flange of said housing with a relatively thin highly flexible annular portion for the free movement of said lip toward and away from the wall of the receptacle, and a single threaded attaching stud connecting said housing to the wall of the receptacle, said stud having a shank projecting axially through and of smaller diameter than the axial opening through said valve element and threaded directly into said valve body.

9. A structure according to claim 8 wherein said valve element at the side thereof opposite said lip has a flat face radially inwardly of said rib, and a coiled biasing spring slightly smaller in diameter than said rib and coaxial with said stud and having opposite ends engaging said face and said housing.

References Cited in the file of this patent

UNITED STATES PATENTS

| | | |
|---|---|---|
| 2,351,547 | Schaal | June 13, 1944 |
| 2,508,403 | Knauss | May 23, 1950 |
| 2,646,063 | Hayes | July 21, 1953 |
| 2,665,702 | Rawson | Jan. 12, 1954 |
| 2,815,041 | Rimsha | Dec. 3, 1957 |
| 2,854,996 | Hughes | Oct. 7, 1958 |

FOREIGN PATENTS

| | | |
|---|---|---|
| 1,132,251 | France | Oct. 26, 1956 |